United States Patent
Ray et al.

(10) Patent No.: US 11,181,201 B2
(45) Date of Patent: Nov. 23, 2021

(54) EZE-TOP BALL VALVE

(71) Applicant: Habonim Industrial Valves & Actuators Ltd., Galil Elion (IL)

(72) Inventors: Leon Ray, Hila (IL); Yoel Hadar, Kiryat Shmona (IL); Igor Berkovitz, Carmiel (IL)

(73) Assignee: Habonim Industrial Valves & Actuators Ltd., Galil Elion (IL)

( * ) Notice: Subject to any disclaimer, the term of this patent is extended or adjusted under 35 U.S.C. 154(b) by 0 days.

(21) Appl. No.: 16/882,777

(22) Filed: May 26, 2020

(65) Prior Publication Data

US 2020/0370662 A1  Nov. 26, 2020

Related U.S. Application Data

(60) Provisional application No. 62/853,028, filed on May 26, 2019.

(51) Int. Cl.
*F16K 5/06* (2006.01)
*F16K 5/20* (2006.01)

(52) U.S. Cl.
CPC .......... *F16K 5/0636* (2013.01); *F16K 5/0689* (2013.01); *F16K 5/201* (2013.01); *F16K 5/204* (2013.01); *F16K 5/205* (2013.01)

(58) Field of Classification Search
CPC ...... F16K 5/0636; F16K 5/0689; F16K 5/204; F16K 5/201; F16K 5/205
USPC .............. 251/315.01–315.16, 360–363, 175, 251/180–185
See application file for complete search history.

(56) References Cited

U.S. PATENT DOCUMENTS

| | | | | |
|---|---|---|---|---|
| 2,819,868 A * | 1/1958 | Cauffman | ............... | F16K 5/201 251/315.14 |
| 3,037,738 A * | 6/1962 | Jackson | .................. | F16K 5/201 251/172 |
| 3,219,055 A * | 11/1965 | Dumm | .................. | F16K 5/0678 137/315.2 |
| 3,771,545 A * | 11/1973 | Allen | .................... | F16K 5/0673 137/315.21 |
| 3,891,183 A * | 6/1975 | Feiring | ................. | F16K 5/0678 251/315.08 |
| 4,084,608 A * | 4/1978 | Laignel | ................. | F16K 5/0673 137/246.22 |
| 4,477,055 A * | 10/1984 | Partridge | .............. | F16K 5/0673 137/328 |
| 4,506,864 A * | 3/1985 | Hartmann | ............... | F16K 5/201 251/174 |
| 6,669,171 B1 * | 12/2003 | Stunkard | ............... | F16K 5/0642 251/315.08 |

(Continued)

*Primary Examiner* — John Bastianelli
(74) *Attorney, Agent, or Firm* — A.C. Entis-IP Ltd.; Allan C. Entis

(57) ABSTRACT

A top-entry trunnion ball valve comprising: a housing formed having first and second fluid flow ports, a cavity through which fluid flows when the valve is open and a top opening through which the cavity is accessible; a ball housed in the cavity formed having a through hole for passage of fluid and rotatable between open and closed positions; a cartridge in the cavity sealed to the housing and comprising a seat sealed to the ball; wherein the cartridge and top opening are sized to enable the cartridge to be inserted into and sealed to the housing and removed from the cavity via the top opening.

7 Claims, 10 Drawing Sheets

(56) References Cited

U.S. PATENT DOCUMENTS 7,690,626 B2\* 4/2010 Stunkard ............... F16K 5/0668
251/174

\* cited by examiner

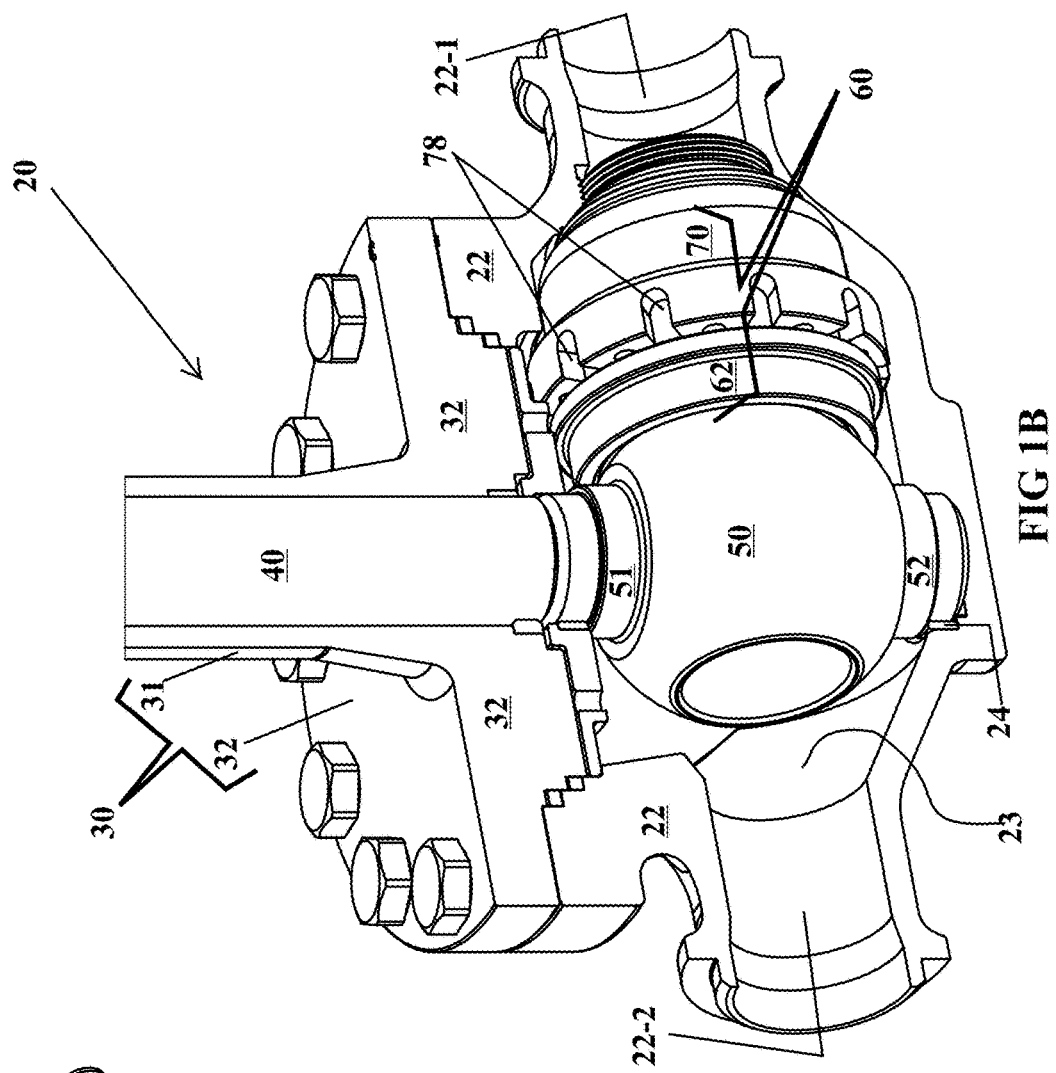
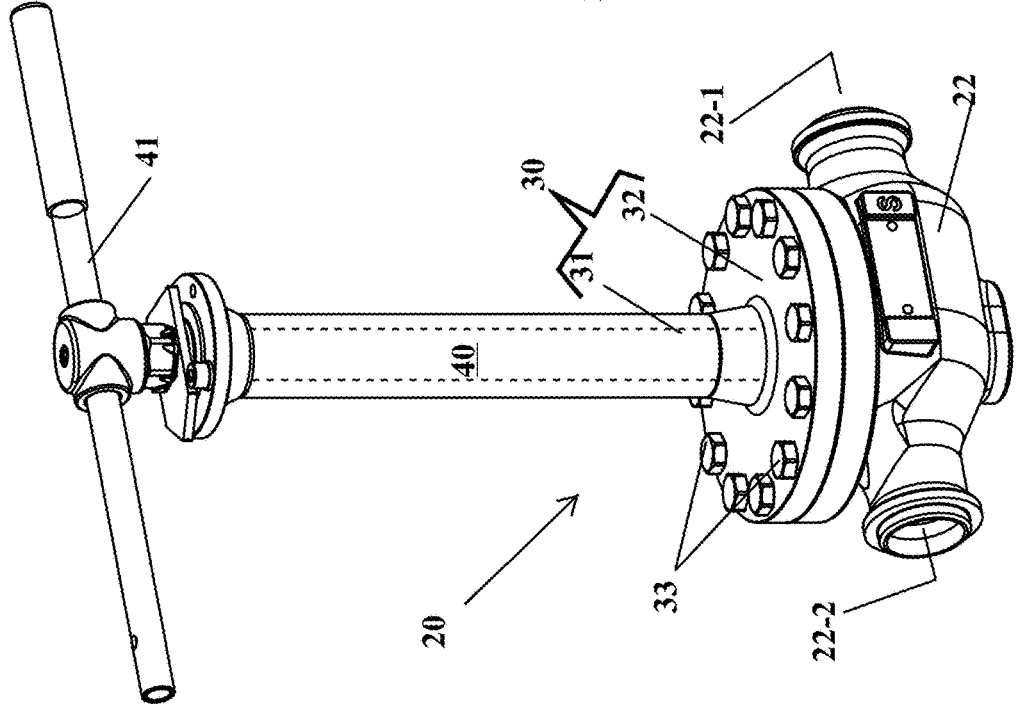
FIG 1B
FIG 1A

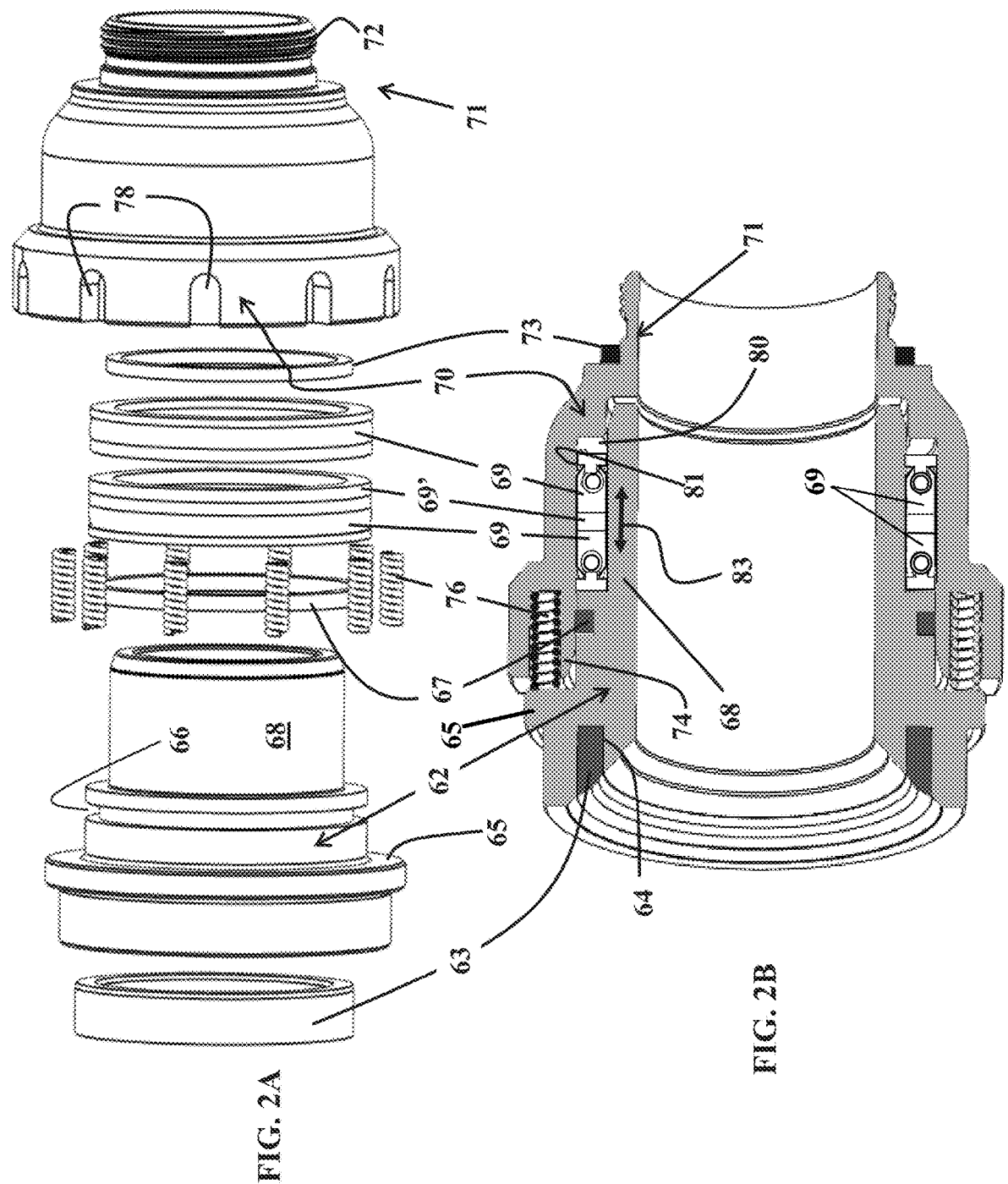

EZE-TOP BALL VALVE

RELATED APPLICATIONS

The present application claims the benefit under 35 U.S.C. 119(e) of U.S. Provisional Application 62/853,028 filed on May 26, 2019, the disclosure of which is incorporated herein by reference.

TECHNICAL FIELD

Embodiments of the disclosure relate to top-entry ball valves that may operate to control fluid flow.

BACKGROUND

A typical ball valve comprises a housing having a fluid flow inlet, upstream port opposite a fluid flow outlet, downstream port, and a ball having a through hole formed along a diameter of the ball that is held in an internal cavity of the housing and is sealed to the cavity by a least one annular gasket referred to as a "seat". Typically, the ball is held between and sealed to the housing by a pair of seats—an upstream seat and a downstream seat. The ball may be rotated to align the through hole with the inlet and outlet fluid flow ports to open the valve and enable fluid-flow between the ports through the valve, and be rotated to align the through hole facing away from the ports to close the valve and block fluid flow through the valve. The ball is coupled to a shaft referred to as a stem that extends from the internal cavity of the housing to outside of the housing and may be protected by a sleeve referred to as a "bonnet" that is sealed to the housing. Rotating the stem about its axis, typically thorough, a quarter turn of 90°, rotates the ball between open and closed orientations of the ball that respectively open and close the valve.

In a trunnion mounted ball valve, the ball is mounted to a trunnion in the housing cavity that shares a common axis of rotation with the valve stem and stabilizes the position of the ball in the cavity against displacement in directions parallel to fluid flow through the valve. In a floating ball valve, the ball is absent trunnion support and exhibits displacement parallel to direction of fluid flow, which aids in sealing the valve against fluid leakage through the valve when the valve is closed. When closing the valve, fluid pressure displaces the ball in a downstream flow direction to press the ball to the downstream seat that holds the ball and "dynamically" seal the ball to the downstream seat and thereby close and seal the valve against fluid flow.

In a cryogenic floating ball valve operated to control flow of cryogenic fluids, the ball is generally formed having a pressure release hole through which gas that evaporates from cryogenic fluid trapped in the cavity housing may escape without generating dangerous and potentially explosive gas overpressure in the valve. The valve operates to dynamically seal the ball effectively against only a given one of the seats that holds the ball. The valve is "monodirectional" and properly closes and seals to block fluid flow for only that direction of fluid flow through the valve for which the given one seat is downstream and when closed the pressure release hole faces upstream. In a cryogenic double seat trunnion ball valve standards generally require that at least one of the seats provide a pressure release function.

SUMMARY

An aspect of an embodiment of the disclosure relates to providing a trunnion mounted, single seat ball valve, optionally referred to as an "EZ-Top valve" or simply "EZE-Top", comprising a housing in which a ball and a seat that seals to the ball may be inserted, mechanically secured in, and sealed to a cavity of the housing, through a top opening of the housing.

In an embodiment the seat is comprised in a cartridge having a cowling and a seat holder mounted in the cowling that holds the seat. The seat holder is sealed to the cowling by a gasket and at least one double acting piston lip seal, and rests on at least one elastic biasing element, which when compressed applies elastic force to push the seat holder out from the cowling. The cowling and the valve housing adjacent a first of first and second fluid flow ports through which fluid flows through the valve are configured with matching threads. so that after insertion through the top opening and into the housing cavity, the cartridge may be secured and sealed to the housing adjacent the first fluid flow port by screwing the cowling into the housing. With the cartridge screwed into the housing, the ball may be inserted through the top opening and into the housing cavity with a trunnion of the ball seated in a trunnion socket of the valve housing. A stem of the valve, which is used to rotate the ball and turn the valve ON and OFF when the valve is fully assembled, is optionally configured for use as a lever when coupled to the ball, and may be used to tilt the ball into the seat and compress the at least one biasing element so that the seat is spring loaded against the ball. A centering cover plate through which the stem passes may then be seated in a recess of the housing to secure the ball and stem in place and the ball sealed against the seat. The at least one lip seal that seals the seat holder to the cartridge cowling operates to generate force responsive to fluid pressure in the valve in either a downstream or upstream direction to maintain sealing of the seat to the ball. As a result, an EZ-Top valve in accordance with an embodiment of the disclosure may advantageously be used to control fluid flow through the valve in either of opposite directions between the valve's fluid flow ports.

In an embodiment, an EZE-Top ball valve is configured as a cryogenic firesafe ball valve.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale FIG. 1A schematically shows a perspective view of an EZE-Top valve comprising a housing and bonnet, in accordance with an embodiment of the disclosure;

FIG. 1B schematically shows perspective cutaway view of the EZE-Top valve housing shown in FIG. 1A, in accordance with an embodiment of the disclosure;

FIG. 2A schematically shows an exploded view of a seat cartridge comprised in EZE-Top, in accordance with an embodiment of the disclosure;

FIG. 2B schematically shows a cross section view of the seat shown in FIG. 2A, in accordance with an embodiment of the disclosure;

DETAILED DESCRIPTION

Figure 3:
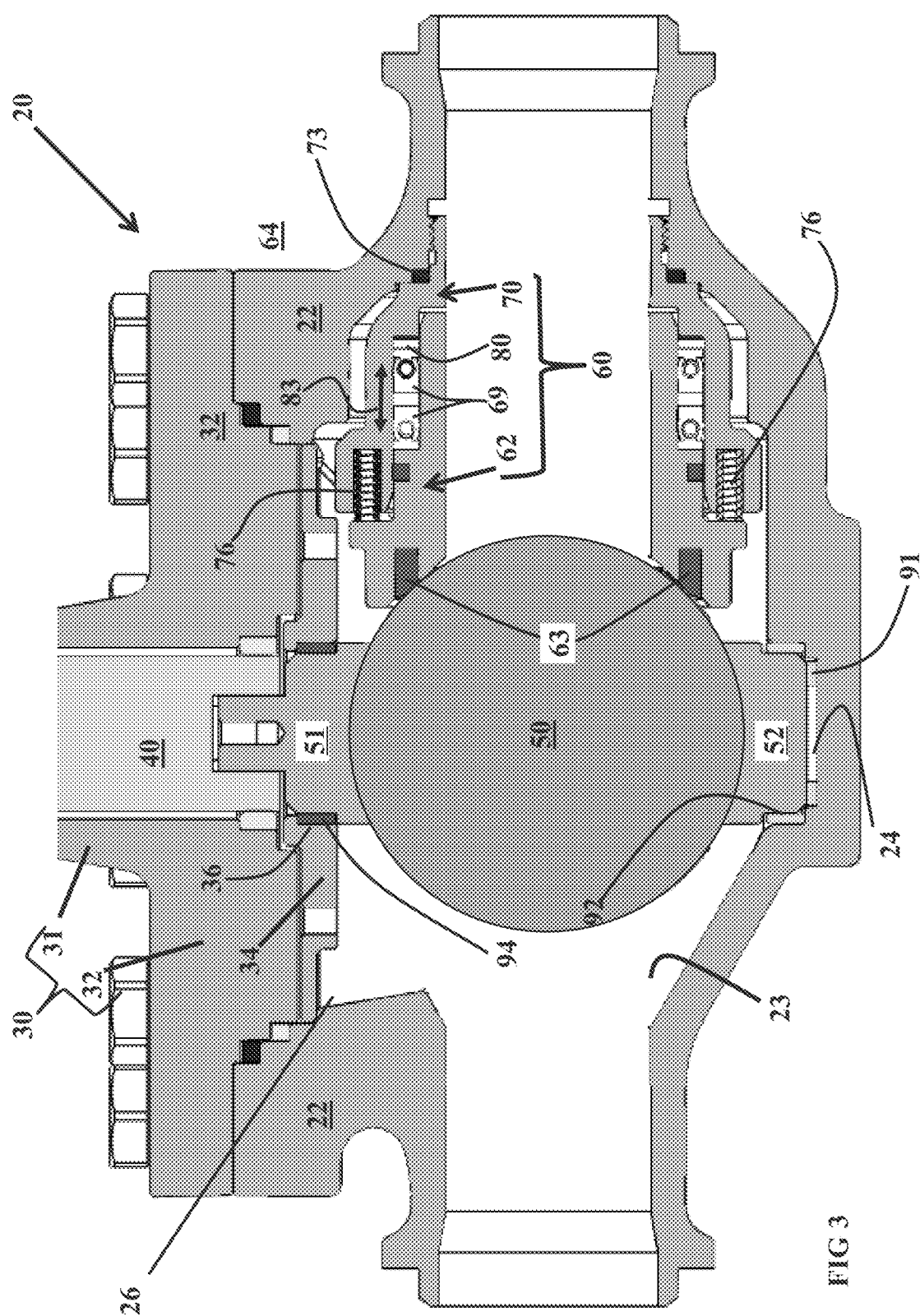
FIG. 3 schematically shows a cross section view the housing and bonnet of the EZE-Top valve shown in FIGS. 1A-1B and internal components that the housing and bonnet comprise, in accordance with an embodiment of the disclosure.

In the detailed description below, features of the construction of an EZE-Top valve are described and discussed with reference to FIGS. 1A-3. Assembly of an EZE-Top valve in accordance with an embodiment is described and discussed with respect to FIGS. 4A-4G.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive "or".

FIG. 1A shows a perspective external view of an EZE-Top valve 20, in accordance with an embodiment of the disclosure. EZE-Top 20 optionally comprises a valve housing 22 having fluid flow ports 22-1 and 22-2 and a bonnet 30 comprising a bonnet sleeve 31 and a bonnet flange 32 attached to the valve housing optionally by bolts 33. Bonnet sleeve 32 is sealed to and protects a stem 40 shown in dashed lines. Stem 40 is coupled to a control handle 41 which may be manually or automatically operated to rotate stem 40 to open and close EZE-Top to fluid flow through EZE-Top in either direction between fluid flow ports 22-1 and 22-2.

FIG. 1B schematically shows a shaded perspective cutaway view of EZE-Top housing 22 and bonnet 30 that shows components shown in FIG. 1A, and in addition a cavity 23 of housing 22, in accordance with an embodiment. Cavity 23 houses a ball 50 having top and bottom trunnions 51 and 52 respectively, and a seat cartridge 60 comprising a seat holder 62 and a cowling 70 screwed into housing 22 adjacent fluid flow port 22-1. Bottom trunnion 52 is rotatably held in a trunnion socket 24 formed in housing 22 and top trunnion 51 is rotatably held in a centering cover plate 34 seated in a top opening 26 of the housing.

FIGS. 2A and 2B schematically show exploded and cross section views respectively of seat cartridge 60 comprising seat holder 62 and cowling 70, in accordance with an embodiment of the disclosure. Seat holder 62 has a seat 63 optionally held in a seat recess 64. Seat holder 62 may be formed having a shoulder 65, a gasket recess 66 for holding a gasket 67, and a stem 68. Optionally, a pair of back to back lip seals 69 spaced apart by a spacer 69' are configured to fit on and seal to stem 68, and an inner surface 81 (FIG. 2B) of cowling 70. Cowling 70 optionally comprises an end 71 having threads 72 configured to match threads in housing 22. Cowling end 71 may be sized to receive a cartridge-to-housing gasket 73. Optionally, the cowling is formed having a plurality of sockets 74 (FIG. 2B) for receiving a plurality of biasing springs 76 and a plurality of slots 78 for coupling the cowling to a matching torque wrench. When seat cartridge 60 is assembled as shown in FIG. 2B, seat holder 62, is received in cowling 70, shoulder 65 of the seat holder rests on biasing springs 76 held in sockets 74, and gasket 67 seals the seat holder to the cowling. Stem 68 of seat holder 62 and the cowling 70 form a lacuna 80 that contains lip seals 69 and a spacer 69'. The lip seals seal to the surface of stem 68 and surface 81 of cowling 70 and are movable in lacuna 80 back and forth in directions indicated by a double-head arrow 83 to provide seat cartridge 60 with double action piston in response to overpressure in EZE-Top and to aid in maintaining a seal between ball 50 (FIGS. 1B and 3) and seat 63.

FIG. 3 schematically shows a cross section of EZE-Top 20 that shows details of components of the valve comprised in housing 22 and bonnet 30 when the EZE-Top valve is assembled and closed to prevent fluid flow through the valve, in accordance with an embodiment of the disclosure. Cartridge 60 is screwed into housing 22 adjacent fluid flow port 22-1 and sealed to housing 22 by cartridge-to-housing gasket 73. Ball 50 is rotatably held in housing 22 by top and bottom trunnions 51 and 52. Bottom trunnion 52 is rotatably held in trunnion socket 24 by a thrust washer 91 and a bearing 92. Top trunnion 51 is held in a through hole socket 36 in centering cover plate 34 by a bearing 94. When mounted in housing 22 and held by trunnions 51 and 52 in sockets 24 and 36 respectively, ball 50 pushes against seat 63 and compresses biasing springs 76, as a result of which the biasing springs operate to resiliently seal seat 63 to the ball. Top trunnion 51 is connected to stem 40 which may be rotated by manually operating handle 41 (FIG. 1A) to rotate ball 50 between open and closed positions of EZE-Top valve 20.

As noted above, lip seals 69 are moveable in lacuna 80 in directions indicated by double head arrow 83 to provide double action piston sealing of seat 63 to ball 50. Overpressure of fluid in EZE-Top valve 20 to the right or left of ball 50 in FIG. 3 generates leakage of fluid into lacuna 80 to the right or left respectively of lip seals 69 resulting in pressure that operates to push seat holder 62 and seat 63 towards ball 50 and provide force that aids in sealing seal holder 62 to cowling 70.

FIGS. 4A-4G schematically illustrate assembling EZE-Top vale 20, in accordance with an embodiment of the disclosure.

Figure 4A:
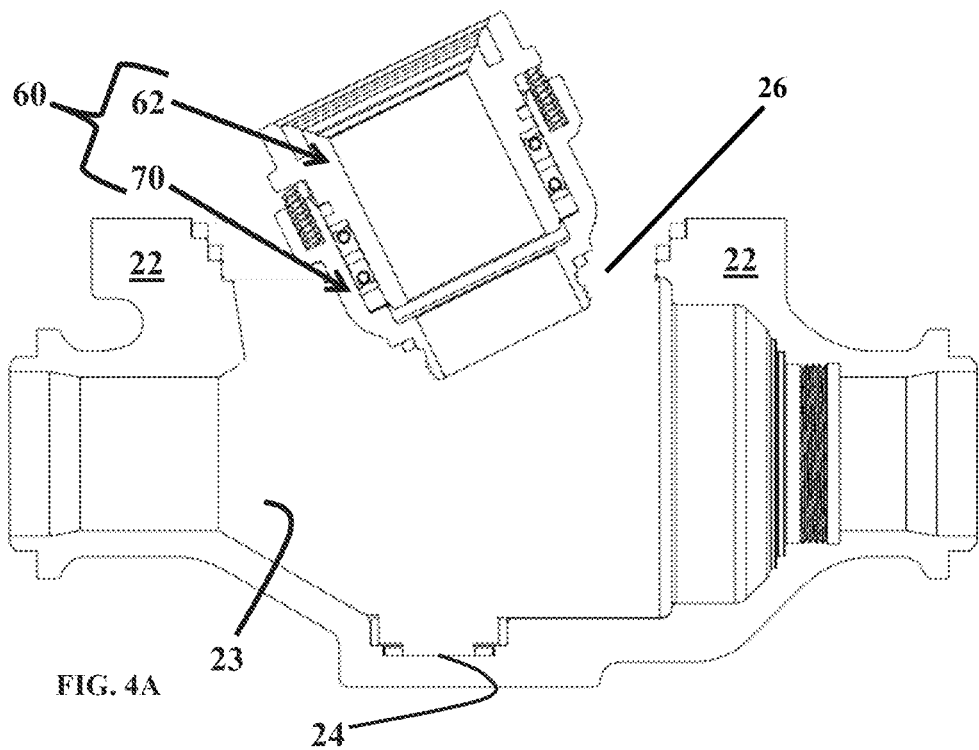
FIGS. 4A-4G schematically illustrate assembly of an EZE-Top valve in accordance with an embodiment of the disclosure.
Figure 4B:
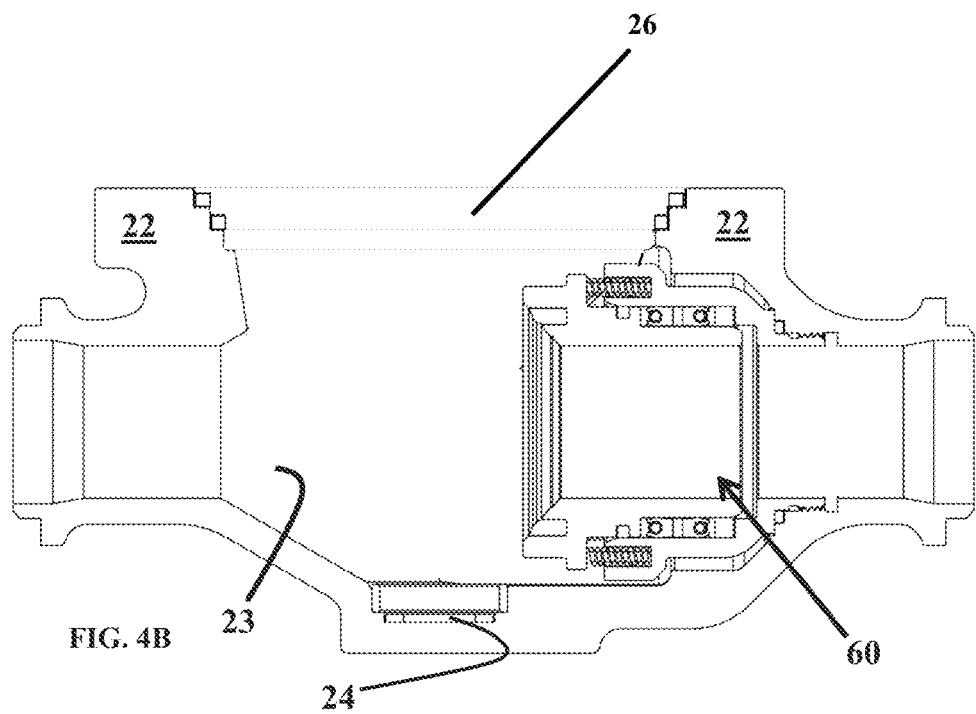
Figure 4C:
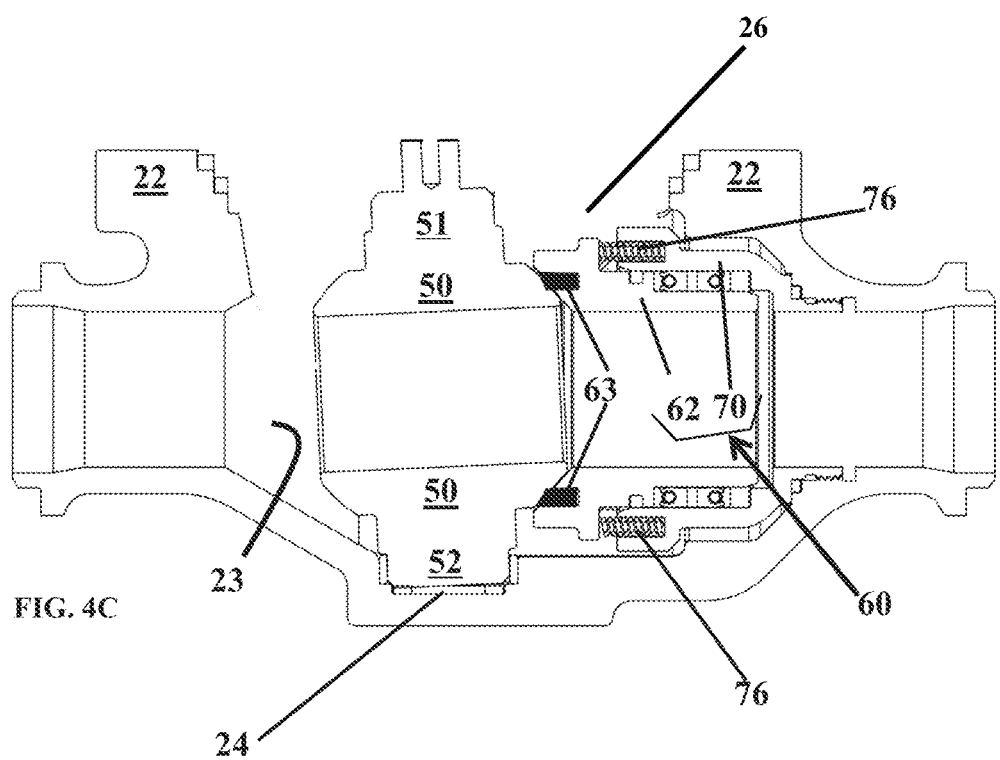
Figure 4D:
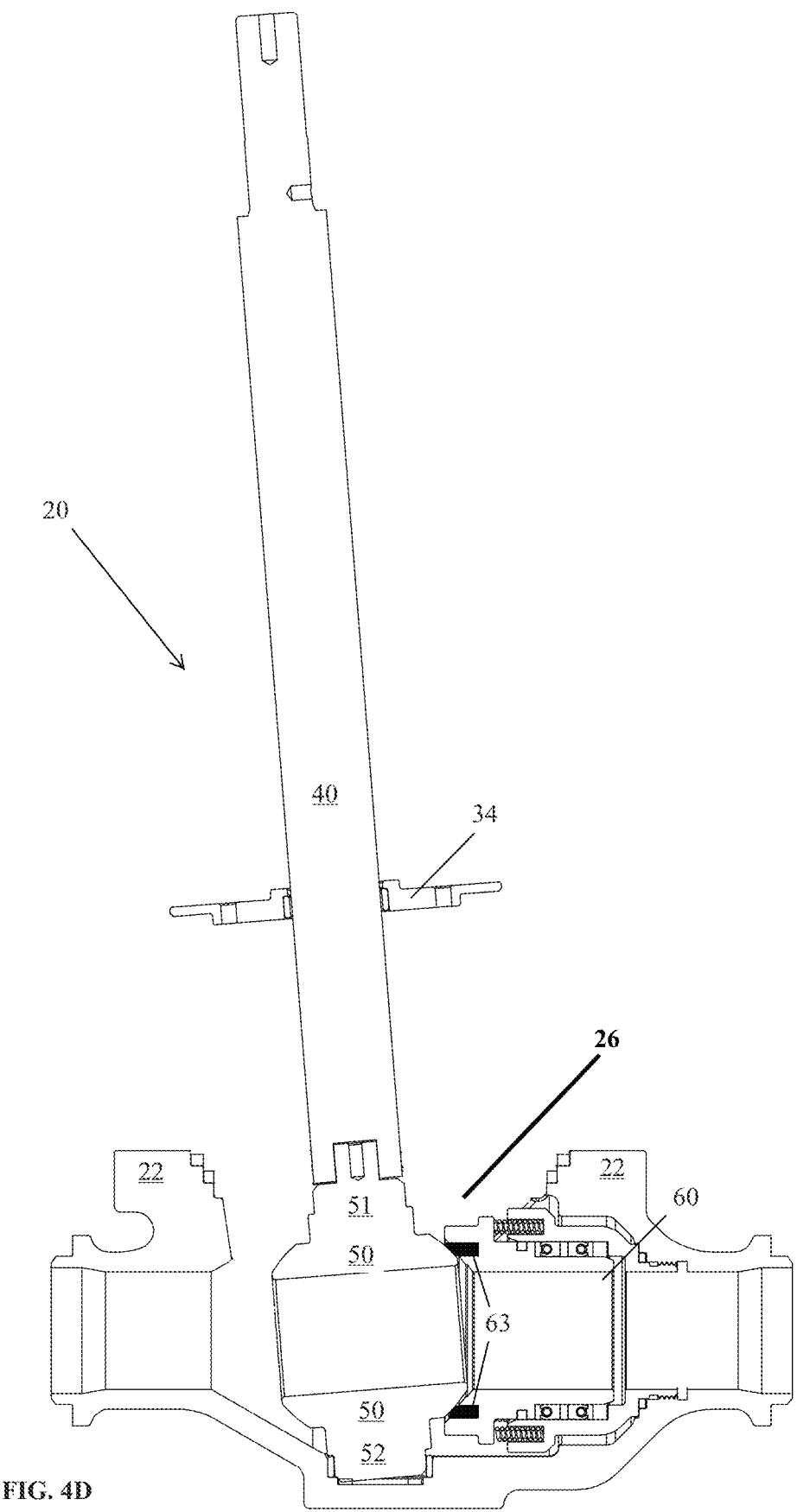
Figure 4E:
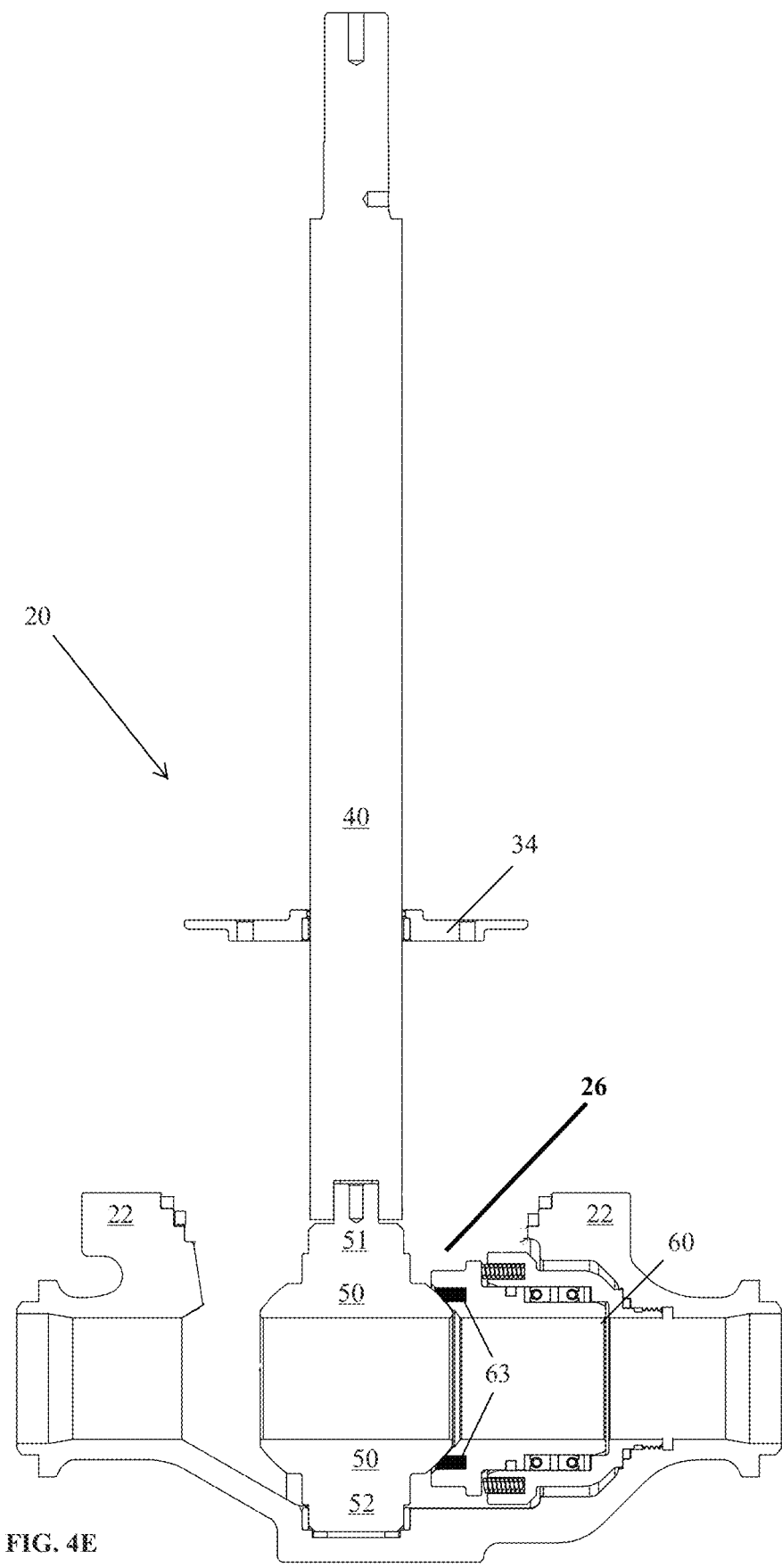
Figure 4F:
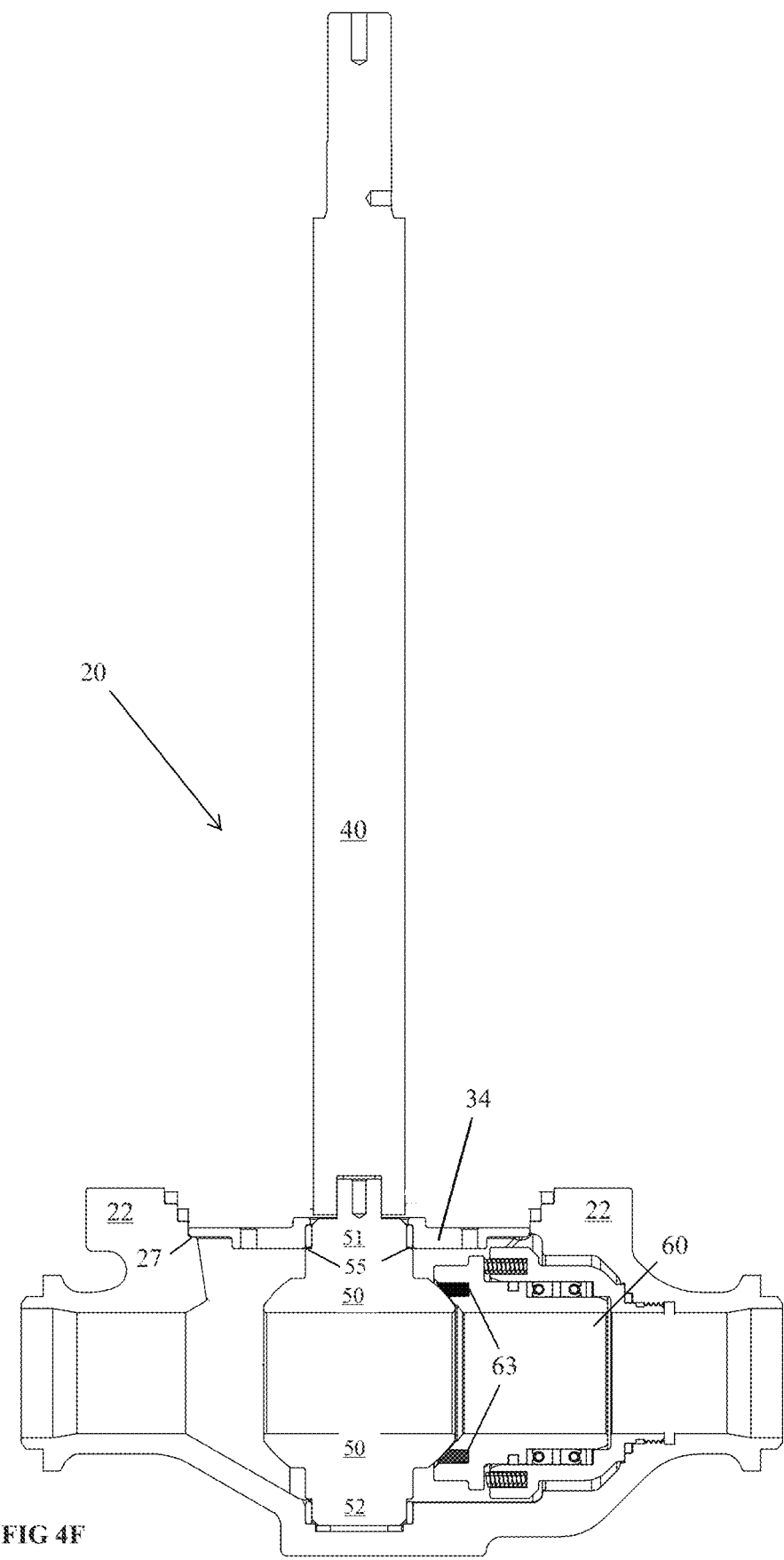
Figure 4G:
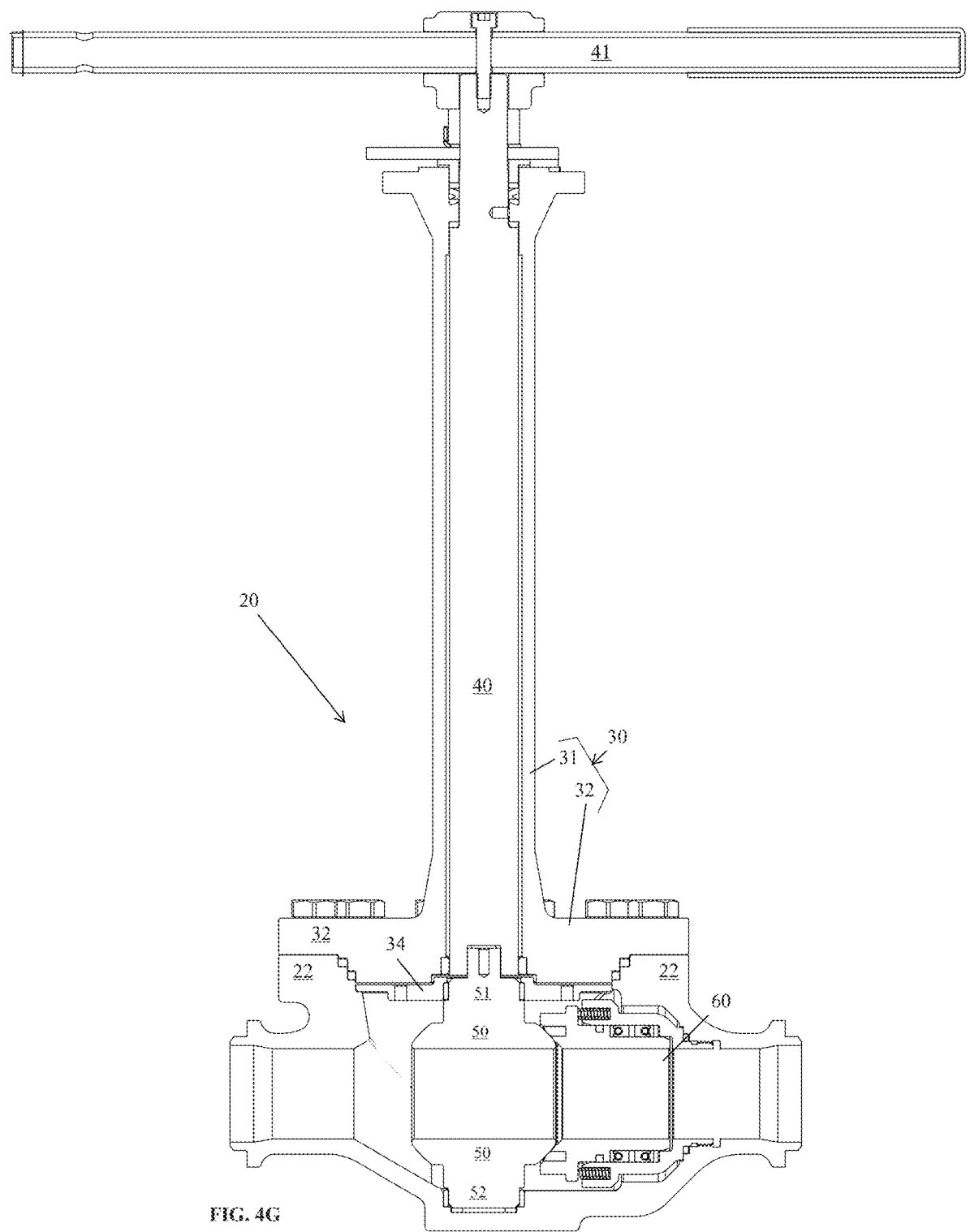

In FIG. 4A cartridge 60 is introduced into cavity 23 of housing 22 through top opening 26 in the housing, and in FIG. 4B cartridge 60 is screwed into the housing, optionally using a torque wrench (not shown) that fits through top opening 26 and has a set of teeth that match and are insertable into slots 78 of the cartridge (FIGS. 1B, 2A). In FIG. 4C ball 50 is introduced into cavity 23 of housing 22 and the ball's bottom trunnion set into trunnion socket 24. Because seat 63 is spring loaded in seat holder 62, at this stage of assembly ball 50 is not "upright" and is rotated counterclockwise as seen in FIG. 4C about bottom trunnion 52. To aright ball 50, as schematically shown in FIG. 4D, stem 40 is attached to upper trunnion 51 of ball 50 and used as a lever to rotate ball 50 clockwise to an upright position and compress springs 78. FIG. 4E shows ball 50 after stem 40 has been used as a lever to rotate the ball to an upright position and compress springs 76 and spring load the springs and therefore seat 63 to seal the seat to the ball. To secure ball 50 upright and sealed to seat 63 centering cover plate 34, shown in FIGS. 4D and 4E is lowered along stem 40 into top opening 26 to rest on a shoulder 55 formed on top trunnion 51 and a step 27 that runs along the circumference of top opening 26. With centering cover plate 34 in place and securing ball 50 upright, bonnet flange 31 is bolted to housing 22 to seal the housing, lock down the ball 50 and cartridge 60 assembled inside the housing and attach bonnet 30 to EZE-Top valve 20, as schematically shown in FIG. 4G. Assembly is completed by attaching handle 41 to stem 40.

It is noted that an EZE-Top valve in accordance with an embodiment of the disclosure similar to EZE-Top valve 20 may be produced in different sizes and with different aspect ratios between dimensions of the EZE-Top valve. By way of example, it may be advantageous that a bonnet flange 32 in an EZE-Top valve be raised relative to ball 50 in valve housing 22 (FIG. 1A, 1B, 4G) of EZE-Top valve 20.

Figure 5A:
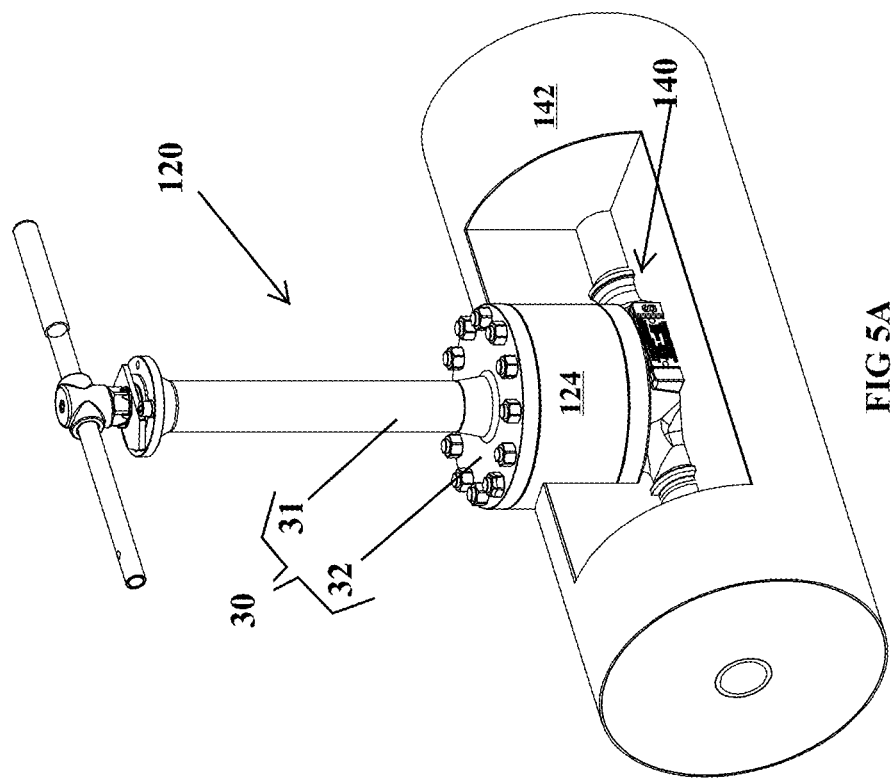
FIG. 5A schematically shows an EZE-Top valve similar to the EZE-Top valve shown in FIGS. 1A-1B having a raised bonnet, in accordance with an embodiment of the disclosure.
Figure 5B:
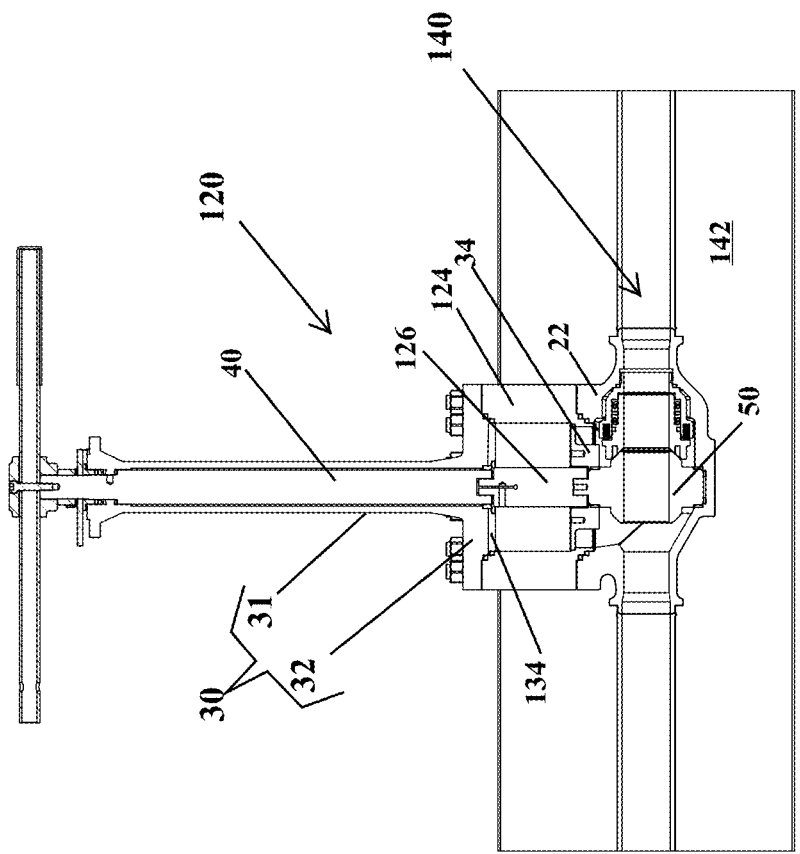
FIG. 5B schematically shows a cross section view of the EZE-Top valve shown FIG. 5A, in accordance with an embodiment of the disclosure.

For example, FIG. 5A schematically shows an EZE-TOP valve 120 coupled to a pipe system 140 to control fluid flow in the pipe system in accordance with an embodiment of the disclosure. Pipe system 140 is protected by a thermal insulator 142 to moderate heat flow from or to fluid in pipe system 140. EZE-TOP valve 120 comprises a tall housing 124 that facilitates servicing EZE-Top valve 120 through the top opening of the valve, in general without having to disturb insulation 140. FIG. 5B schematically shows a cross section view of EZE-Top valve 120, in accordance with an embodiment of the disclosure. Tall housing 122 optionally houses an extension rod 126 that couples ball 50 to a stem 40, and a modified centering cover plate 134. Optionally, except for the addition of tall housing 124, extension rod 126 and modified centering cover plate 134, components of EZE-Top 120 and EZE-Top 20 are the same.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

The invention claimed is:

1. A top-entry trunnion ball valve comprising:
   a housing formed having first and second fluid flow ports, a cavity through which fluid flows when the valve is open and a top opening through which the cavity is accessible;
   a ball housed in the cavity formed having a through hole for passage of fluid and rotatable between open and closed positions;
   a cartridge in the cavity sealed to the housing and sized to enable the cartridge to be inserted into and sealed to the housing and removed from the cavity via the top opening and comprising: a seat; a cowling; a seat holder that holds the seat slidingly mounted inside and sealed to the cowling; and at least one elastic biasing element that urges the seat holder out from the cowling to press and seal the seat to the ball;
   a double acting piston mounted in a lacuna formed between the seat holder and the cowling that seals the seat holder to the cowling;
   wherein the double acting piston is movable in the lacuna back and forth parallel to a direction along which the at least one elastic member urges the seat holder out from the cowling by pressure of fluid that leaks into the lacuna from the first or second fluid flow port to provide force that presses the seat to the ball.

2. The valve according to claim 1 wherein the seat holder is formed having a slot in which the seat is held.

3. The valve according to claim 1 wherein the double acting piston comprises at least one lip seal.

4. The valve according to claim 3 wherein the at least one lip seal comprises two lip seals mounted back to back and separated by a spacer.

5. The valve according to claim 1 wherein the housing is formed having internal threads adjacent the first fluid flow port and the cowling is formed having external threads matching the internal threads of the housing and the cowling is mounted to the housing by screwing the cowling into the housing.

6. The valve according to claim 5 wherein the cowling has a shape that facilitates coupling the cartridge to a wrench useable to apply torque to the cowling to screw the cartridge into the housing.

7. The valve according to claim 6 wherein the facilitating shape is formed having a plurality of slots that into which teeth of a wrench are insertable to couple the wrench to the cowling.

* * * * *